(12) United States Patent
Morgan

(10) Patent No.: US 9,816,600 B2
(45) Date of Patent: Nov. 14, 2017

(54) SLEW DRIVE GEARBOX WITH INNER RACEWAY INTEGRATED TO TORQUE TUBE

(71) Applicant: Brent Morgan, Phoenix, AZ (US)

(72) Inventor: Brent Morgan, Phoenix, AZ (US)

(73) Assignee: KINEMATICS, LLC, Phoenix, AZ (US)

( * ) Notice: Subject to any disclaimer, the term of this patent is extended or adjusted under 35 U.S.C. 154(b) by 410 days.

(21) Appl. No.: 14/499,111

(22) Filed: Sep. 27, 2014

(65) Prior Publication Data
US 2016/0091051 A1 Mar. 31, 2016

(51) Int. Cl.
| | |
|---|---|
| F16H 57/039 | (2012.01) |
| F16C 17/10 | (2006.01) |
| F16H 55/22 | (2006.01) |
| F16C 19/16 | (2006.01) |
| F16H 57/00 | (2012.01) |
| F16H 57/021 | (2012.01) |
| F16H 55/06 | (2006.01) |
| F16H 57/02 | (2012.01) |

(52) U.S. Cl.
CPC ........... *F16H 57/039* (2013.01); *F16C 17/10* (2013.01); *F16C 19/16* (2013.01); *F16H 55/22* (2013.01); *F16H 57/0025* (2013.01); *F16H 57/021* (2013.01); *F16H 2055/065* (2013.01); *F16H 2057/02078* (2013.01)

(58) Field of Classification Search
CPC .......................... F16H 57/039; F16H 2055/065
See application file for complete search history.

(56) References Cited

U.S. PATENT DOCUMENTS

| | | | | |
|---|---|---|---|---|
| 2,720,119 A | * | 10/1955 | Sherman | F16H 55/16 264/262 |
| 6,058,794 A | * | 5/2000 | Hempel | B22D 19/00 164/98 |
| 6,125,713 A | * | 10/2000 | Langlois | B23P 6/00 29/402.01 |
| 6,137,853 A | * | 10/2000 | Duckering | G21C 17/003 376/252 |
| 6,237,863 B1 | * | 5/2001 | Smith | A01G 25/092 239/722 |
| 7,475,612 B2 | * | 1/2009 | Kaneiwa | B62D 5/0409 180/444 |
| 8,904,999 B2 | * | 12/2014 | Kondo | F02D 9/1065 123/337 |
| 2004/0025403 A1 | * | 2/2004 | Barker | A01K 89/06 43/20 |

(Continued)

*Primary Examiner* — William Kelleher
*Assistant Examiner* — Gregory Prather
(74) *Attorney, Agent, or Firm* — Parsons & Goltry; Robert A. Parsons; Michael W. Goltry

(57) ABSTRACT

A slew drive includes a housing, a worm shaft having a worm thread carried within the housing for rotational movement and a torque tube having an outer surface. The torque tube is carried by the housing for rotational movement perpendicularly to the worm shaft and worm thread. A ring gear section having teeth is carried by the torque tube with the teeth engaging the worm threads. An inner raceway is fabricated as an integral part of the torque tube. An outer raceway is fabricated as an integral part of the housing, the outer raceway radially overlying the inner raceway, and bearing elements captured between the inner raceway and the outer raceway.

14 Claims, 5 Drawing Sheets

(56) References Cited

U.S. PATENT DOCUMENTS

| | | | |
|---|---|---|---|
| 2008/0026857 A1* | 1/2008 | Grazia | B29C 45/14065 464/178 |
| 2011/0056460 A1* | 3/2011 | Kondo | F02D 9/1065 123/337 |
| 2012/0183368 A1* | 7/2012 | Fuhrer | B23F 17/006 409/8 |
| 2012/0241404 A1* | 9/2012 | Bobeck | B66C 23/68 212/300 |
| 2013/0239722 A1* | 9/2013 | Vollner | B66C 23/84 74/416 |
| 2013/0270060 A1* | 10/2013 | Houssian | B65G 33/14 198/300 |
| 2014/0352465 A1* | 12/2014 | Chae | F16H 19/04 74/30 |
| 2015/0082923 A1* | 3/2015 | Morgan | F16H 1/16 74/89.14 |
| 2015/0316639 A1* | 11/2015 | Russ | F24J 2/541 250/203.4 |

* cited by examiner

SLEW DRIVE GEARBOX WITH INNER RACEWAY INTEGRATED TO TORQUE TUBE

FIELD OF THE INVENTION

This invention relates to gearboxes.

More particularly, the present invention relates to Slew drive gearboxes.

BACKGROUND OF THE INVENTION

In the field of drive systems, a slew drive is a device that can safely hold radial and axial loads, as well as transmit a torque for rotation. A slew drive employs a worm mechanism, also called a screw drive, to turn a gear about an axis perpendicular to the axis of the worm. This combination reduces the speed of the driven member and also multiplies its torque. There are many applications for the slew drive. Currently, they are employed in the generation of renewable energy, particularly in solar and wind energy. Due to the load-holding power and rotational torque strength of slew drives, they are well suited to solar trackers and wind turbines. They can, however, be employed in substantially any instance where rotational movement, or "slewing" is desired.

While the current slew drives function quite well in performing the desired tasks, they can be difficult to attach to the structure to be rotated. Typically in a slew drive, the outer diameter of the drive rotates. Attaching a slew drive to structures to be rotated usually requires the fabrication of fittings to couple structures to the drive. This increases cost, complexity and weight. Additionally, the various bearing that need to be used can be expensive and difficult to fit into the devices.

It would be highly advantageous, therefore, to remedy the foregoing and other deficiencies inherent in the prior art.

An object of the invention is to provide an integrated inner raceway and torque tube.

SUMMARY OF THE INVENTION

Briefly, to achieve the desired objects and advantages of the instant invention provided is a slew drive. The slew drive includes a housing, a worm shaft having a worm thread carried within the housing for rotational movement, and a torque tube having an outer surface. The torque tube is carried by the housing for rotational movement perpendicularly to the worm shaft and worm thread. A ring gear section having teeth is carried by the torque tube with the teeth engaging the worm threads. An inner raceway is fabricated as an integral part of the torque tube. An outer raceway is fabricated as an integral part of the housing. The outer raceway radially overlies the inner raceway capturing bearing elements therebetween. Rotation of the worm shaft rotates the worm threads engaging the teeth of the ring gear section, thereby rotating the ring gear section which rotates the torque tube relative the housing, riding on the bearing elements.

In a specific aspect, the housing further includes a ring portion having a sidewall with an inner surface. The outer raceway is integrated into the inner surface. The torque tube is carried within a central opening defined by the ring portion. A tubular portion is coupled to the ring portion and defines a volume having a longitudinal axis forming a tangent to an outer diameter of the ring portion. The central opening and the volume defined by the tubular portion are in communication, with the volume defined by the tubular portion overlapping the central opening as a chord with respect to the outer diameter of the ring portion. The worm shaft is carried within the volume defined by the tubular portion, with at least a portion of the worm threads extend into the central opening at the chord and engaging the teeth of the ring gear section.

In yet another aspect, the torque tube includes a first end and a second end. The outer surface of the torque tube includes a radially outwardly extending back plate adjacent the first end, an annular inset surface spaced from the first end and adjacent the back plate, a radially outwardly extending dividing extension adjacent the annular inset surface, a gear receiving annular inset surface adjacent the dividing extension, and a radially outwardly extending top plate adjacent the gear receiving annular inset surface at the second end. The ring gear section is attached to the radially outwardly extending top plate and carried overlying the gear receiving annular inset surface.

BRIEF DESCRIPTION OF THE DRAWINGS

The foregoing and further and more specific objects and advantages of the invention will become readily apparent to those skilled in the art from the following detailed description of a preferred embodiment thereof, taken in conjunction with the drawings in which.

DETAILED DESCRIPTION OF A PREFERRED EMBODIMENT

Figure 1:
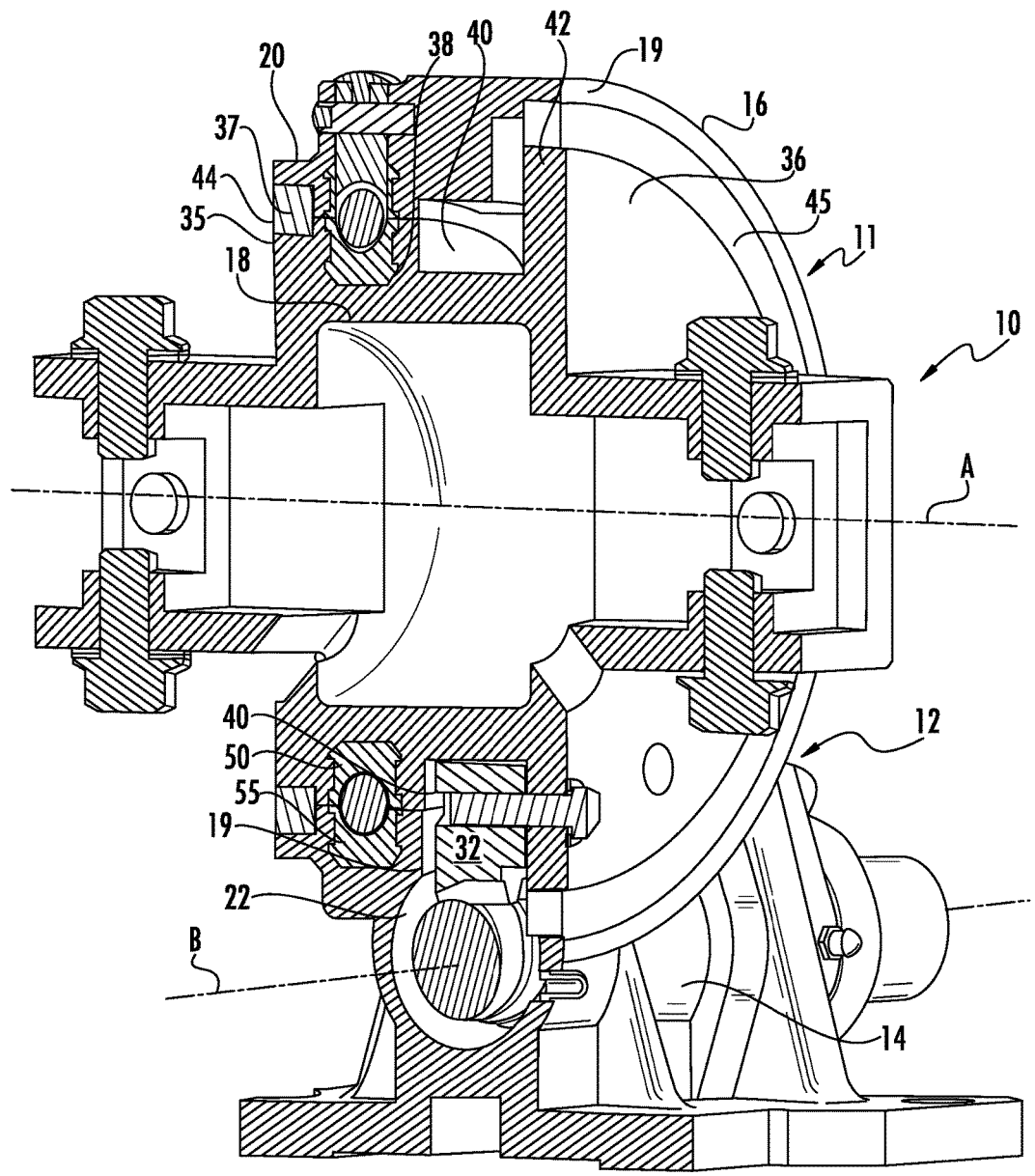
FIG. 1 is a sectional end view of a slew drive according to the present invention.

Turning now to the drawings in which like reference characters indicate corresponding elements throughout the several views, attention is directed to FIG. 1 which illustrates a slew drive generally designated 10, according to the present invention. Slew drive 10 includes a gearbox 11 with a housing 12 having a tubular portion 14 and a ring portion 16. Ring portion 16 defines a central opening 18 extending centrally therethrough along an axis A. Tubular portion 14 is coupled to ring portion 16 and defines a volume 17 having a longitudinal axis designated B. It will be noted that Axis A is perpendicular to longitudinal axis B. Longitudinal axis B preferably forms a tangent to an outer diameter of ring portion 16. Ring portion 16 includes a top edge 19, a back edge 20 and a sidewall 21 extending therebetween. An inner surface of sidewall 21 includes a raceway channel 22 proximate back edge 20. An opening 23 is formed in sidewall 21 of ring portion 16 adjacent tubular portion 14 such that central opening 18 and volume 17 are in communication therethrough, with volume 17 overlapping central opening 18 as a chord with respect to the outer diameter of ring portion 16.

Figure 2:
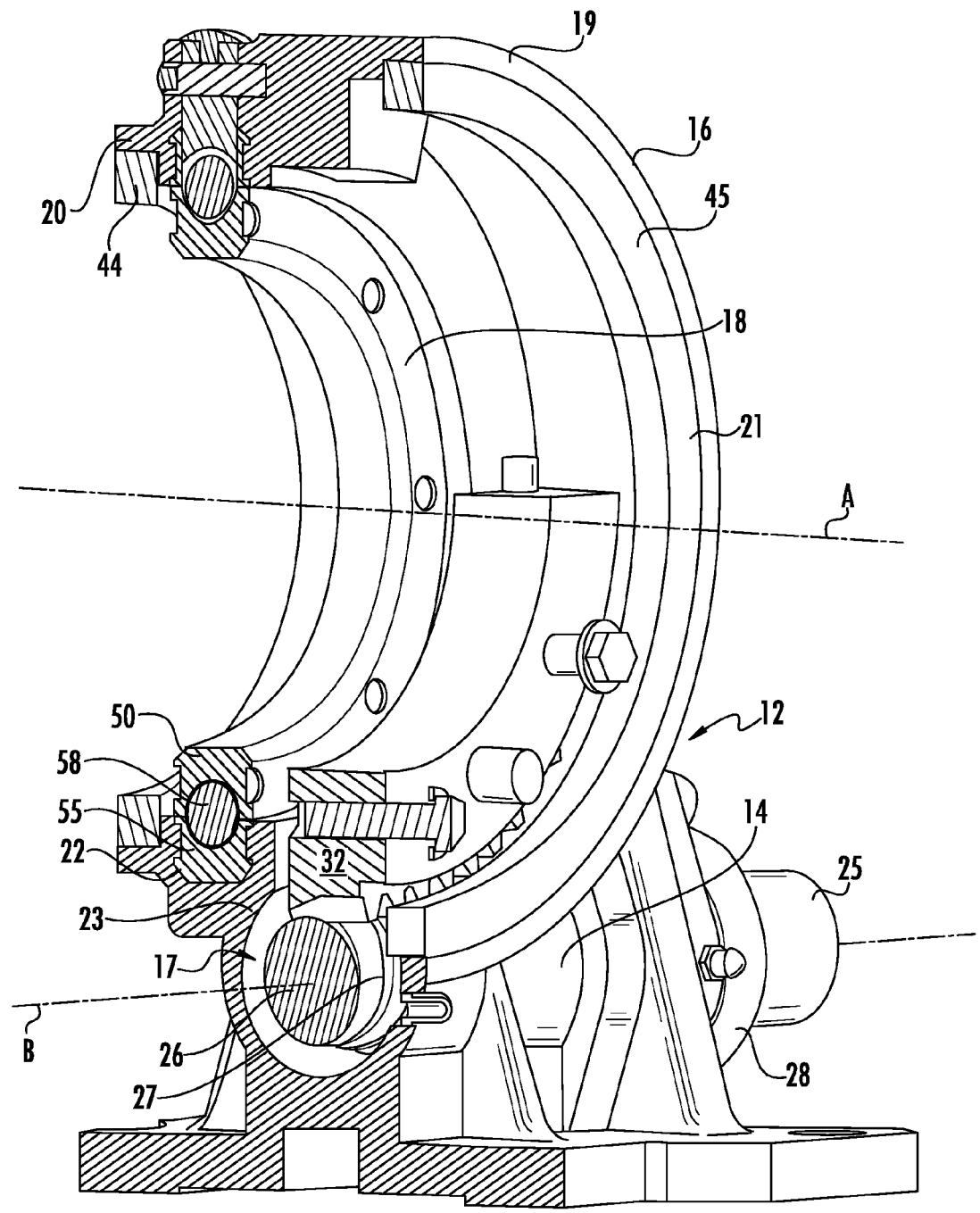
FIG. 2 is a sectional end view of the housing of the slew drive.

Still referring to FIGS. 1 and 2, slew drive 10 further includes a drive motor 25 coupled to tubular portion 14 of housing 12. Drive motor 25 is coupled to a worm shaft 26 carrying an hourglass shaped worm thread 27, by a planetary gear assembly 28. Planetary gear assembly 28 is not described or shown in detail, as these assemblies are well known in the art. Worm thread 27 is carried within volume 17 of tubular portion 14 of housing 12, and extends through opening 23 of ring portion 16 at the chord defined previously. Drive motor 25 drives worm thread 27 having a portion of worm thread 27 extending into central space 18 through opening 23. For purposes which will be described presently. It will be understood that while an hourglass shaped worm thread 27 is preferred, a conventionally shaped worm thread can be employed. Also, while a drive motor 25 is carried by the housing in the preferred embodiment, it will be understood that when multiple slewing drives are employed, the slewing drives can be driven with a series of slave shafts from a master drive motor without using a motor on each individual slewing drive.

Figure 3:
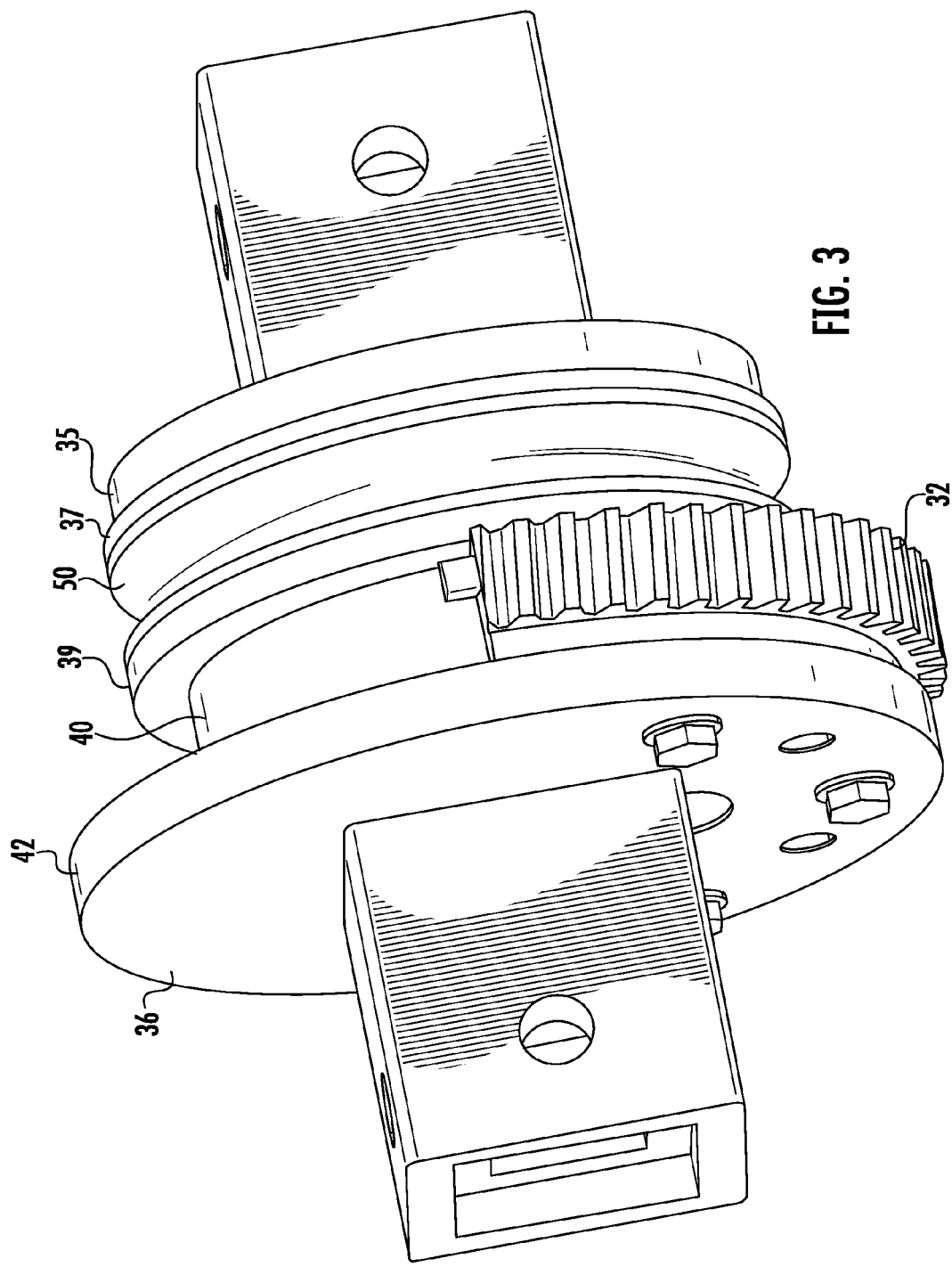
FIG. 3 is a perspective view of the torque tube with integrated raceway.
Figure 4:
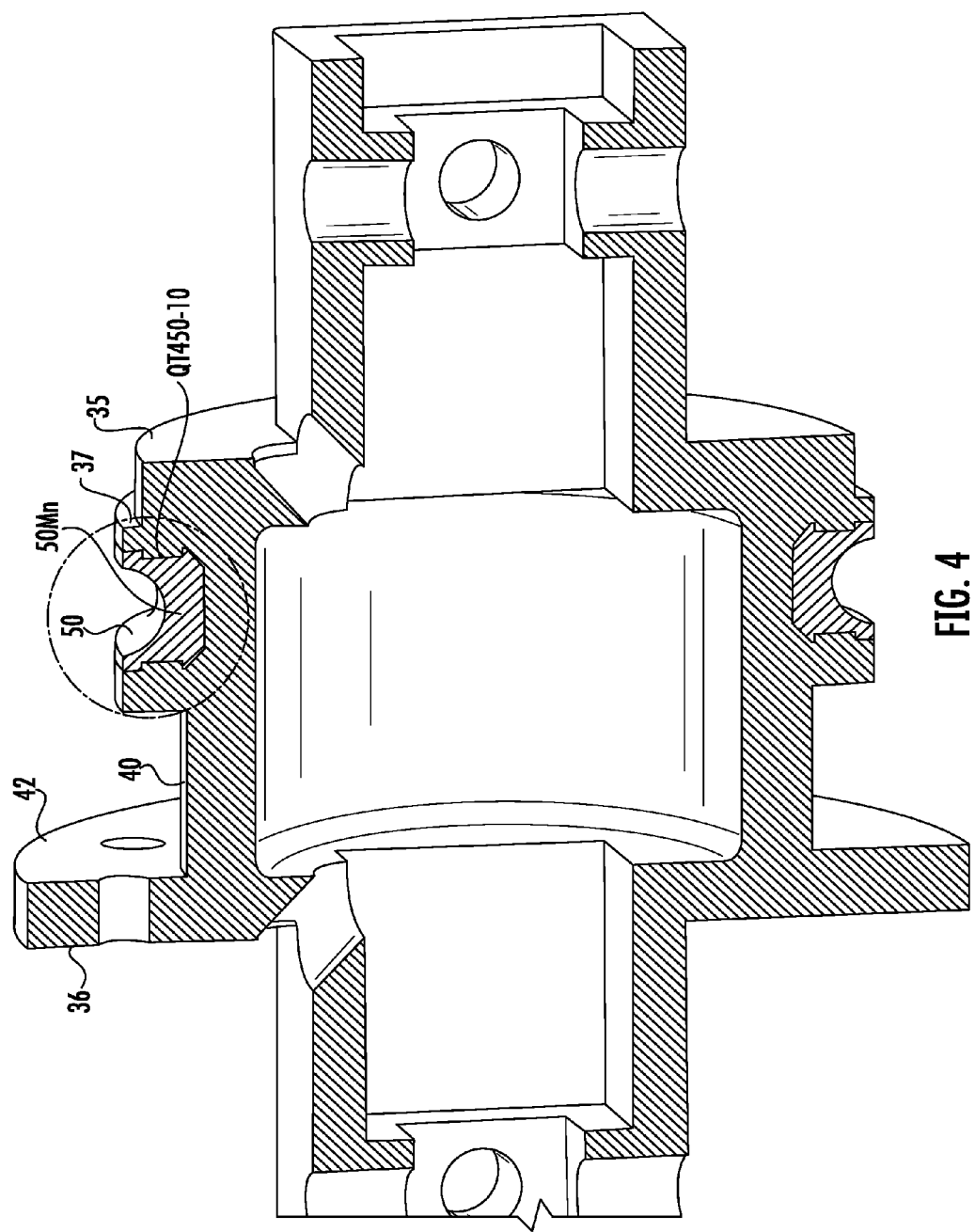
FIG. 4 is a sectional side view of the torque tube with integrated raceway.
Figure 5:
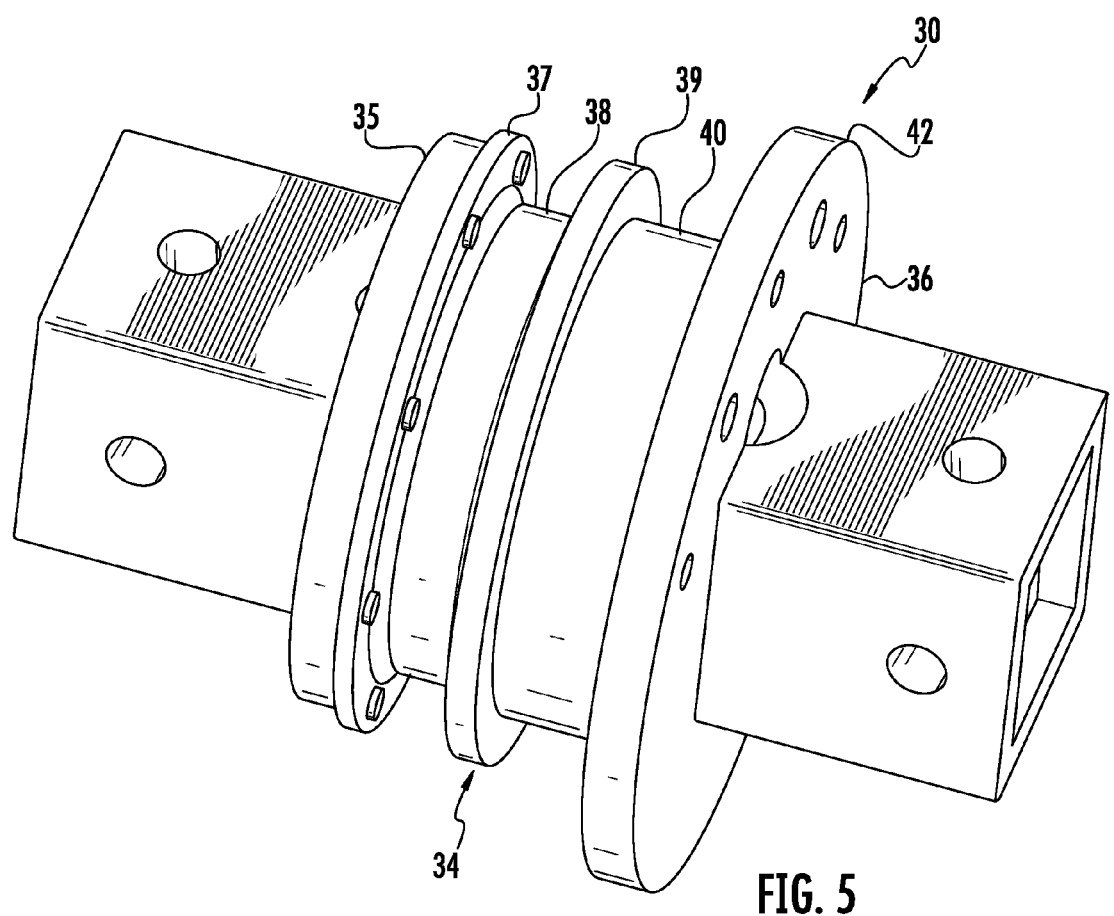
FIG. 5 is a perspective view of the torque tube.

Still referring to FIG. 1, with additional to FIGS. 3-5, ring portion 16 of housing 12 carries a torque tube 30 and a ring gear section 32. With brief reference to FIG. 5, torque tube 30 is illustrated. Torque tube 30 includes an annular body 34 having opposed ends 35 and 36. Annular body 34 includes an outer surface defined by a radially outwardly extending back plate 37 adjacent end 35, an annular inset surface 38 spaced from end 35 and adjacent back plate 37, a radially outwardly extending dividing extension 39 adjacent annular inset surface 38, separating a gear receiving annular inset surface 40 from annular inset surface 38, and a radially outwardly extending top plate 42 adjacent gear receiving annular inset surface 40 at end 36. Torque tube 30 is positioned within central opening 18 with back plate 37 engaging back edge 20 of ring portion 16 with a seal brush 44 and top plate 42 engaging top edge 19 of ring portion 16 with a seal brush 45. Seal brush 44 and seal brush 45 seal torque tube 30 to ring portion 16 while allowing rotation of torque tube 30 relative ring portion 16. When in Position, annular inset surface 38 is radially aligned with raceway channel 22 and a portion of annular inset 40 is radially aligned with opening 19.

Referring specifically to FIG. 3, ring gear section 32 is fixedly attached directly to top plate 42 so as to be positioned overlying inset surface 40 between dividing extension 39 and top plate 40. Ring gear section 32 can be attached by fastening members such as pins, screws, bolts and the like, or permanent fasteners such as welding, adhesives and the like. It will be understood that ring gear section 32 is attached so that teeth of ring gear section 32 extend radially outwardly. Thus, the teeth of gear segment 32 and worm thread 27 engage and intermesh through opening 19. Here it should be noted that a ring gear has a full 360° circumference. Ring gear segment 32 of the present invention is a section of a ring gear less than 360°. In the preferred embodiment, a ring gear is divided into 2-4 segments for use. Thus the preferred segments are 90°, 120° and 180°, but can be anything less than 360°. In this manner, as drive motor 25 drives worm shaft 26 in a first direction, ring gear section 32 is driven in a first direction with a corresponding rotation of torque tube 30 in the first direction. When drive motor 25 is reversed and drives the worm shaft in a second direction, ring gear section 32 is driven in a second direction with a corresponding rotation of torque tube 30 in the second direction. In this manner, when in use, housing 12 is installed as an immovable fixture. The centrally located torque tube can then be rotated relative housing 12.

Still referring to FIG. 3, with additional reference to FIG. 4, a bearing inner raceway 50 is carried within annular body 34 of torque tube 30 at annular inset surface 38. Inner raceway 50 can be fabricated in a single molding or machining step of the same material as the rest of torque tube 30, or, as is preferred is cast in position or formed and pressed into position. In the later instances, inner raceway 50 can be fabricated of a more durable material, or material having other preferred characteristics. In Either case, the raceway is integrated into the torque tube to form a single, integral, one piece structure.

Referring back to FIGS. 1 and 2, a bearing outer raceway 55 is carried within ring portion 16 of housing 12 at raceway channel 22. As with inner raceway 50, outer raceway 55 can be fabricated in a single molding or machining step of the same material as the rest of ring portion 16, or, as is preferred is cast in position or formed and pressed into position. In the later instances, outer raceway 55 can be fabricated of a more durable material, or material having other preferred characteristics. In Either case, the raceway is integrated into the ring portion to form a single, integral, one piece structure. With torque tube positioned within opening 18, inner raceway 50 and outer raceway 55 overly one another to capture ball bearings 58 therebetween. The integration of inner raceway 50 and outer raceway 55 facilitates ease in installation and manufacturing, weight savings, simplicity of operation, accuracy, and the like.

As can be seen, torque tube 30 includes a central fitting extending outwardly along axis A in both directions. This fitting can be fabricated into torque tube 30 to assist in attaching various structures as desired. However, it should be noted that torque tube 30 can also define an interior opening or socket therethrough as disclosed in co-pending application entitled "SLEW DRIVE GEARBOX WITH TORQUE TUBE" Ser. No. 14/489,462, filed Sep. 17, 2014 and incorporated herein by reference.

Various changes and modifications to the embodiments herein chosen for purposes of illustration will readily occur to those skilled in the art. To the extent that such modifications and variations do not depart from the spirit of the invention, they are intended to be included within the scope thereof, which is assessed only by a fair interpretation of the following claims.

Having fully described the invention in such clear and concise terms as to enable those skilled in the art to understand and practice the same, the invention claimed is:

1. A slew drive comprising:
   a housing;
   a worm shaft having a worm thread carried within the housing for rotational movement;
   a torque tube having an outer surface, the torque tube carried by the housing for rotational movement perpendicularly to the worm shaft and worm thread;
   a sector ring gear having teeth, the sector ring gear being less than a 360° ring and carried by the torque tube with the teeth engaging the worm threads;
   an inner raceway fabricated as an integral part of the torque tube;
   an outer raceway fabricated as an integral part of the housing, the outer raceway radially overlying the inner raceway; and
   bearing elements captured between the inner raceway and the outer raceway;
   whereby rotation of the worm shaft rotates the worm threads engaging the teeth of the sector ring gear, thereby rotating the ring gear section which rotates the torque tube relative the housing, riding on the bearing elements.

2. A slew drive as claimed in claim 1 wherein the housing further comprises:
   a ring portion having a sidewall with an inner surface, the outer raceway integrated into the inner surface, the ring portion defining a central opening, the torque tube carried within the central opening of the ring portion; and a tubular portion coupled to the ring portion and defining a volume having a longitudinal axis forming a tangent to an outer diameter of the ring portion, the central opening and the volume defined by the tubular portion are in communication, with the volume defined by the tubular portion overlapping the central opening as a chord with respect to the outer diameter of the ring portion, the worm shaft having the worm thread carried within the volume defined by the tubular portion, with at least a portion of the worm threads extend into the central opening at the chord and engaging the teeth of the sector ring gear.

3. A slew drive as claimed in claim 2 wherein the torque tube further includes an outer surface, the inner raceway integrated into the outer surface of the torque tube.

4. A slew drive as claimed in claim 3 wherein the torque tube includes a first end and a second end, and the outer surface of the torque tube includes a radially outwardly extending back plate adjacent the first end, an annular inset surface spaced from the first end and adjacent the back plate, a radially outwardly extending dividing extension adjacent the annular inset surface, a gear receiving annular inset surface adjacent the dividing extension, and a radially outwardly extending top plate adjacent the gear receiving annular inset surface at the second end.

5. A slew drive as claimed in claim 4 wherein the sector ring gear is attached to the radially outwardly extending top plate and carried overlying the gear receiving annular inset surface.

6. A slew drive as claimed in claim 4 further comprising:
a first seal member carried between an edge of the back plate and a back edge of the ring portion; and
a second seal member carried between an edge of the top plate and a top edge of the ring portion.

7. A slew drive as claimed in claim 1 wherein the torque tube includes a central socket.

8. A slew drive as claimed in claim 1 wherein the torque tube includes a central fitting extending outwardly along an axis of rotation of the torque tube.

9. A slew drive comprising:
a housing having a tubular portion and a ring portion, the ring portion defining a central opening, the tubular portion coupled to the ring portion and defining a volume having a longitudinal axis forming a tangent to an outer diameter of the ring portion, the central opening and the volume defined by the tubular portion are in communication, with the volume defined by the tubular portion overlapping the central opening as a chord with respect to the outer diameter of the ring portion;
a worm shaft having a worm thread is carried within the volume defined by the tubular portion, at least a portion of the worm threads extend into the central opening at the chord;
a torque tube having an outer surface, an inner raceway fabricated as an integral part of the outer surface of the torque tube, the torque tube being carried for rotational movement within the central opening of the ring portion;
a sector ring gear having teeth, the sector ring gear being less than a 360° ring and carried by the torque tube with the teeth engaging the worm threads extending into the central opening at the chord;
an outer raceway fabricated as an integral part of the ring portion of the housing, the outer raceway radially overlying the inner raceway; and
bearing elements captured between the inner raceway and the outer raceway.

10. A slew drive as claimed in claim 9 wherein the torque tube includes a first end and a second end, and the outer surface of the torque tube includes a radially outwardly extending back plate adjacent the first end, an annular inset surface spaced from the first end and adjacent the back plate, a radially outwardly extending dividing extension adjacent the annular inset surface, a gear receiving annular inset surface adjacent the dividing extension, and a radially outwardly extending top plate adjacent the gear receiving annular inset surface at the second end.

11. A slew drive as claimed in claim 10 wherein the sector ring gear is attached to the radially outwardly extending top plate and carried overlying the gear receiving annular inset surface.

12. A slew drive as claimed in claim 10 further comprising:
a first seal member carried between an edge of the back plate and a back edge of the ring portion; and
a second seal member carried between an edge of the top plate and a top edge of the ring portion.

13. A slew drive as claimed in claim 9 wherein the torque tube includes a central socket.

14. A slew drive as claimed in claim 9 wherein the torque tube includes a central fitting extending outwardly along an axis of rotation of the torque tube.

* * * * *